Nov. 3, 1936.    H. BRANDL    2,059,547

MEANS FOR DRIVING THE COUNTING MECHANISM OF GAS METERS

Filed July 14, 1932    2 Sheets-Sheet 1

Inventor
Hans Brandl
By Pennie Davis Marvin + Edmonds
Attorneys

Patented Nov. 3, 1936

2,059,547

UNITED STATES PATENT OFFICE 2,059,547

MEANS FOR DRIVING THE COUNTING MECHANISM OF GAS METERS

Hans Brandl, Vienna, Austria, assignor to the firm Compagnie pour la Fabrication des Compteurs et Materiel d'Usines à Gaz, Montrouge, France Application July 14, 1932, Serial No. 622,470
In Great Britain July 23, 1931

2 Claims. (Cl. 73—233)

This invention relates to improved means for driving the counting mechanism of gas meters. In the volumetric measurement of gas a measuring member is driven by the gas to be measured, and this member in its turn drives the counting and registering mechanism through the intermediary of transmission mechanism. If, however, the pressure and/or the temperature of the gas to be measured fluctuates within comparatively wide limits, the figures registered by the counting mechanism must be corrected so as to be valid for normal pressure, normal temperature, and normal atmospheric pressure, if the direct readings of the counting mechanism are not to lead to false conclusions. The necessary calculations for the correction of the figures given by the counting and registering mechanism can, it is true, be carried out with the aid of tables, but this method is troublesome and wasteful of time, and, further, mistakes can never be precluded with certainty.

The present invention provides means for use in connection with gas meters for the driving of the counting mechanism by the measuring instrument or member proper, which means are subject to the influence of devices responsive to temperature, or to the atmospheric pressure, or to the pressure of the gas, or any desired combination of such instruments, and that in such a manner that the deviations from the normal temperature, the normal barometric level, and the normal pressure effect adjustments in the transmission mechanism which give rise to appropriate actuation of the counting mechanism by means of which the gas volume is registered as for normal conditions of temperature and pressure. Tedious calculations for correction are thus rendered superfluous. The transmission mechanism between the measuring instrument or member proper and the counting mechanism consists of a system of rods, that is to say of a lever and link mechanism, and one or more movable points of articulation in this system are under the influence of devices responsive to the temperature, or the atmospheric pressure, or to the gas pressure, or of any desired combination of such instruments.

For the more clear explanation and ready understanding of the invention, one constructional example will first be explained with the aid of the diagrammatic Fig. 1 of the accompanying drawings, in which example the counting mechanism of the gas meter is for the sake of simplicity only influenced by a pressure responsive device which itself is under the influence of the fluctuations occurring in the gas to be measured.

Figure 1:
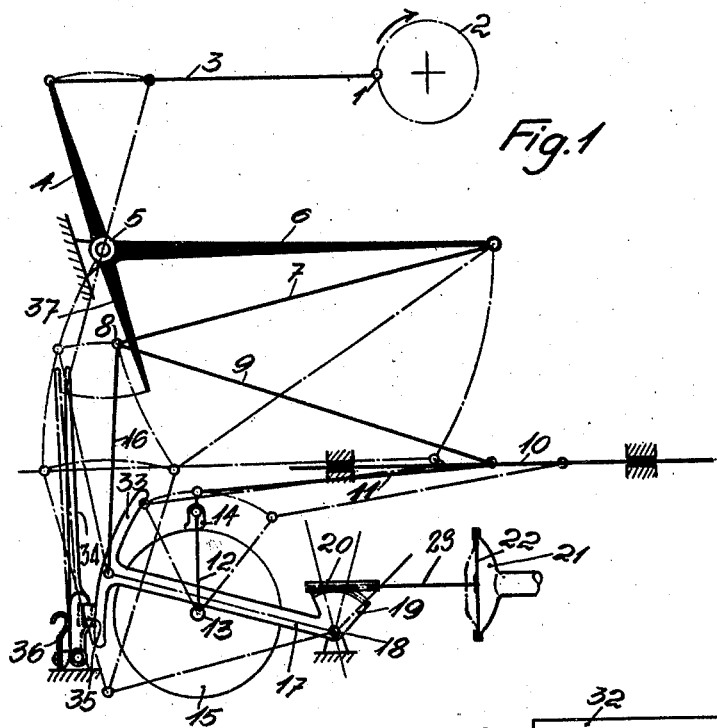

It is assumed that the measuring device proper drives a crank the journal 1 of which moves in the chain-dotted circle 2 in the direction of the arrow shown in connection therewith. This crank grasps a connecting rod 3 which is connected to one arm 4 of a bell-crank lever the axis of rotation 5 of which is fixedly mounted, and the other arm 6 of which is articulated to a link 7 which is connected by means of a joint 8 to a second link 9. This link 9 is articulated to a straight-guided slide 10 which, through the intermediary of a thrusting rod 11 causes an arm 12 to carry out a reciprocating movement about an axis 13. To this arm 12 there is articulated a pawl 14 which effects the driving of a disc 15. Each complete reciprocating movement of the slide 10 rotates the disc 15 by one step, and from this point the counting mechanism takes its drive. As will readily be understood, the slide 10 carries out one complete reciprocating stroke for every complete revolution of the crank pin 1.

With the aid of the constructional example given in Fig. 1 it will now be shown how this transmission mechanism, which consists of the system of levers and links 4, 6, 7, 9, 10, 11, 12, can be made to respond to the influence of the fluctuations registered by a gas pressure responsive device in such a manner that the counting mechanism is caused to take account of deviations from the normal pressure of the gas to be measured in the figures registered and indicated by it.

For this purpose the point of articulation 8 at which the two links 7 and 9 are connected together, and which has to a certain degree freedom of movement, since the slide 10 is also slidable in its direction of movement even when the crank 1 is at rest, is grasped by a link 16 which is connected to a lever 17, in such a manner that, through the rocking of the lever 17 about its pivot point 18 the point of articulation 8 can be displaced. If the point of articulation 8 be drawn somewhat downwards, as understood with reference to Fig. 1, while the crank pin 1 remains stationary, for instance by downward rocking of the lever 17, then the system of links 7, 9 will be rocked about the right-hand end point of the arm 6 as a pivot in a counter-clockwise direction, so that the slide 10 is shifted towards the right. The thrusting rod 11 and therefore also the arm 12 are thereby likewise shifted in company, and it will readily be understood that in this manner not merely the central point of oscillations of the slide 10 and of the arm 12 is displaced, but also the extent of the rocking movement is varied. If the lever 17 be rocked upwards the point of articulation 8 is likewise shifted upwards, the system of links 7, 9 is rocked about the right-hand end point of the lever 6 in a clockwise direction and draws the slide 10 towards the left, there being thereby likewise produced alterations in the drive of the disc 15 which are different from those just indicated.

For the movement of the lever 17 this latter is provided with a toothed sector 19 with which there engages a toothed rack 20 which is slidable in a longitudinal sense and is subject to the influence of a gas pressure responsive device 21, this dependence being illustrated in the drawings by the fact that the diaphragm 22 of this gas pressure responsive device is connected by means of a rod 23 with the toothed rack 20. The gas pressure responsive device 21 is subjected to the influence of the gas to be measured, so that on the occurrence of fluctuations in the pressure of the gas the toothed rack 20 is moved to and fro and thereby rocks the lever 17 in one direction or the other, by means of the sector 19. The variable factors in this construction can be so determined that the variations in the reciprocating movements of the slide 10 brought about by the rocking movements of the lever influence the counting mechanism in such a manner that its readings are accurately or at least approximately accurately valid for gas at normal pressure.

Figure 2:
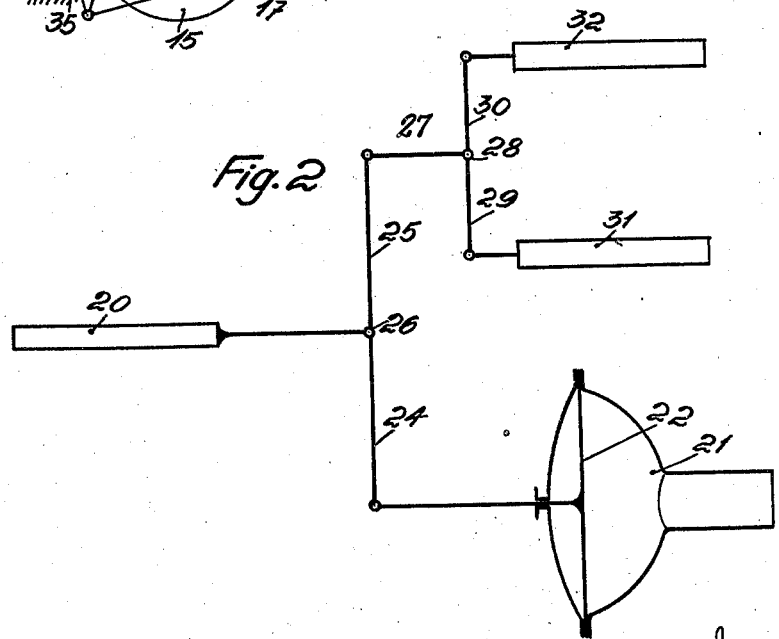
Fig. 2 shows diagrammatically how the embodiment of the invention shown in Fig. 1 can be further developed if the counting mechanism of the gas meter is to respond to the influence not only of a gas pressure responsive device but also of a device responsive to temperature and a device responsive to the atmospheric pressure.

It is equally possible to arrange for the toothed rack 20 to be additionally actuated by other instruments also, if it is desired that the counting mechanism shall take account of deviations from the normal temperature and from the normal barometric level during measurement, and this can be effected, for instance, in the manner diagrammatically illustrated in Fig. 2. The toothed rack 20 is in this case connected to a two-armed lever 24, 25 the pivot 26 of which is freely movable. The arm 24 of this lever is arranged to be actuated by the registering action of the gas pressure responsive device 21; the arm 25 is connected by means of a link 27 to the freely movable pivot 28 of a two-armed lever 29, 30 the one arm 29 of which is put under the influence of a temperature responsive device 31, and the other arm 30 of the same under that of a device responsive to the atmospheric pressure 32. By virtue of this arrangement the measuring and registering actions of the gas pressure responsive device, temperature responsive device, and atmospheric pressure responsive device can be variously additively or subtractively brought to bear in the form of movement transmitted to the toothed rack 20, and the dimensions and other variable factors can be so determined that the counting mechanism takes correct account of all the fluctuations occurring and registered by these instruments during the measurement of the gas.

In order to prevent recoil action of the movements of the system of levers and links upon the measuring instruments 21, 31, and 32, it is advisable to provide in connection with the lever 17 a braking or checking device which liberates this lever only in one of the two dead positions in which, practically speaking, the movements of the system of levers and links and the forces acting therein are temporarily nil. At this moment the lever 17 may be liberated for adjusting movement; in every other position it is arrested, so that there can be no recoil action upon the measuring instruments 21, 31, and 32.

In the form of construction shown in Fig. 1, the lever 17 is to this end provided with a brake disc segment 33 with which there is adapted to cooperate a brake lever 34 with a brake cheek or shoe 35. This brake lever is pressed towards the segment 33 by means of a spring 36. The bell-crank lever 4, 6 is provided with an extension arm 37 which at one end of its oscillations comes up against the brake lever 34 and presses this lever, against the action of the spring 36, away from the brake segment 33, so that this latter, and with it also the lever 17, is liberated. The lever 17 is thus liberated only at an end or dead center position, while it is otherwise held fast by the described braking means. Only during the short period of time in which it is liberated by the brake can this lever be actuated by the instruments 21, 31, and 32 through the intermediary action of the toothed rack 20, and the necessity for the prevention of recoil action of the mechanism upon the measuring instruments is thus satisfied in a particularly simple and reliable manner.

Figure 3:
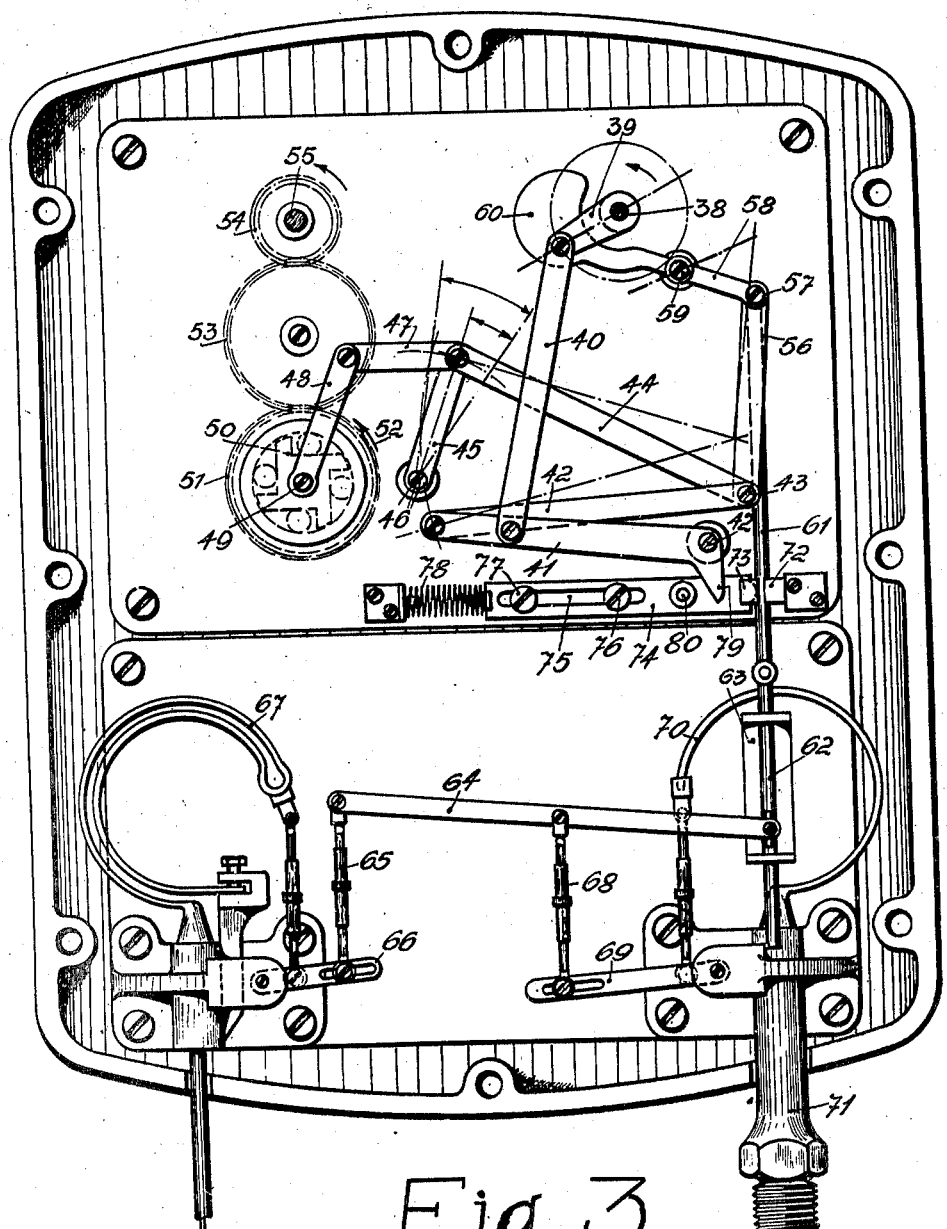
Fig. 3 shows finally a constructional representation of an embodiment of the invention in which the counting mechanism of the gas meter responds to the influence of the fluctuations registered by a gas pressure responsive device and a device responsive to temperature of the gas.

Fig. 3 shows how the invention can be constructively carried out, if the counting mechanism is to be so influenced by a gas pressure responsive device and a temperature responsive device that, whatever the temperature and pressure of the gas may be, this counting mechanism registers the volume which the gas which has passed through the meter would have if pressure and temperature of the gas were normal.

The gas meter, which can be of any desired type, drives the shaft 38 to which the crank 39 is attached. This crank causes, through the intermediary action of a connecting rod 40, a lever 41, which is pivotally mounted upon a pin 42, to rock. The free end of the lever 41 is articulately connected to a link 42 which in its turn is connected through the joint 43 to the link 44. The free end of the link 44 is articulated to an arm 45 which is pivotally mounted about the pin 46, and which is connected by means of the link 47 to the arm 48 attached to the axle 49. The rocking movement of the lever 41 is transmitted by the links 42, 44 to the arm 45, and thence by means of the link 47 to the arm 48 which is parallel to the link 45. Attached to the axle 49 there is a clamping clutch 50, which only acts in one direction, and which couples the spur wheel 51 loosely mounted on the axle 49 with the axle 49 only when the arm 48 is rocked in the direction of the arrow 52; on the return movement of the arm 48 the spur wheel 51 remains stationary. This spur wheel 51 drives the toothed wheel 54, through the intermediary of the gear wheel 53, thereby rotating the axle 55 which in its turn drives the counting mechanism (not shown) of the gas meter.

It will be readily understood that the mechanism just described is substantially identical with that shown in Fig. 1. The pin of the crank 39 corresponds to the pin 1 in Fig. 1, the connecting rod 3 corresponds to the connecting rod 40, the lever 4, 6 corresponds to the lever 41, the links 7, 9 correspond to the links 42, 44, the articulation point 8 to the articulation point 43, the slide 10 to the link 47, and the arm 12 to the arm 48.

The point of articulation 43 is grasped by the link 56 the end 57 of which is connected to a two-armed lever 58 which is mounted upon the axle 59 and carries a counterweight 60 by means of which the mass effect of the oscillating parts of the mechanism are balanced.

To the end 57 of the link 56 there is further articulated a rod 61 which is articulately connected to a slide 62. This slide 62 is straight guided in a bearing 63 and is grasped by a link 64 which is connected by means of the rod 65 to the lever 66 of a thermostatic element 67, and by means of the rod 68 to the lever 69 attached to the Bourdon-tube 70 of a pressure responsive device, this latter being connected by means of a tube 71 to the gas supply line. The thermostat 67 being likewise connected to the gas supply line is subject to the influence of the temperature of the gas to be measured.

The link 64 is thus varyingly adjusted, according to the conditions of pressure and temperature, and actuates in its turn the slide 62 and with it also the rod 61. The movements of the rod 61 are transmitted, through the intermediary of the link 56, to the point of articulation 43 between the links 42 and 44, in precisely the same manner as the articulation point 8 in the form shown in Fig. 1 is shifted by the link 16 in accordance with the movement of the members 20 and 17 in obedience to the fluctuations registered by the measuring instruments 22, 21, and 31 (the influencing of the arm 64 by an atmospheric pressure responsive device is in this case omitted, since this is as a rule not necessary for practical requirements).

The rod 61 passes through the intermediate space between two brake cheeks 72 and 73 of which the one (72) is rigidly mounted, while the other (73) is attached to a slide 74 which is straight guided by means of a slot 75 on the screws 76 and 77 and is so loaded by a spring 78 that the brake block 73 is normally pressed towards the brake block 72. The rod 61 is thus normally so braked that it cannot be moved by the slide 62. The rod 61 is required to be liberated only in an end or dead centre position of the lever- and link-mechanism, and this result is achieved by providing the lever 41 with a projection 79 which in the end or dead centre position of the oscillating lever mechanism comes up against a stop 80 on the slide 74, the slide 74 being thereby so moved, against the action of the spring 78, that the brake block 73 moves away from the brake block 72. Thus in this case also the point of articulation 43 can be shifted under the influence of the thermostat 67 and of the pressure gauge 70 when the lever mechanism is in one end of its stroke or oscillations, while in all other intermediate positions of the lever mechanism this latter, in consequence of the braking arrestment of the rod 61, can exert no recoil action upon the variable responsive instruments 67 and 70. The projection 79 thus corresponds to the arm 37 in the form of construction shown in Fig. 1, and the slide 74 to the brake lever 34 in that form.

From a constructional point of view the mechanism according to the invention can be varied both as to details and in its entirety, without departing from the scope of the invention.

I claim:

1. A gas meter, comprising a rocking lever-and-link-system containing a rocking lever, two links forming together a variable angle, and a reciprocating member, one end of the said links being connected to the said rocking lever and one end of the other link being connected to the said reciprocating member, these two links being movable relatively to the rocking lever of the system by moving the vertex point of the angle formed by them, a driving mechanism for a counting device, the said reciprocating member being connected to the said driving mechanism, this driving mechanism comprising means for transforming the reciprocating movement into a rotating movement, devices responsive to physical conditions of the gas to be measured, means for connecting movable parts of these devices to the vertex point of the said two links, a periodically acting braking mechanism acting on a part of the said connecting means between the said devices responsive to the physical conditions of the gas and the vertex joint of the said links, this braking mechanism permitting the said devices to influence the two links only when the said lever-and-link-system is at one end of its rocking movement.

2. A gas meter, comprising a rocking lever-and-link-system, containing a rocking lever, two links forming together a variable angle, and a reciprocating slide, one end of the said links being connected to the said rocking lever and one end of the other links being connected to the said reciprocating slide, these two links being movable relatively to the rocking lever of the system by moving the vertex joint of the angle formed by the two links, a driving mechanism for a counting device, the said reciprocating slide being connected to the said driving mechanism, this mechanism comprising means for transforming the reciprocating movement into a rotating movement, devices responsive to physical conditions of the gas to be measured, means for connecting movable parts of these devices to the vertex joint of the said two links, a periodically acting braking mechanism acting on a part of the said connecting means between the said devices responsive to the physical conditions of the gas and the vertex joint of the said links, a member for actuation to a rocking movement by the rocking lever-and-link-system, this member acting on the said braking mechanism in such a manner that this mechanism is only lifted at one end of the rocking movement of the said system, the said braking mechanism permitting the said device to influence the two links only when the said lever-and-link-system is at one end of its rocking movement.

HANS BRANDL.